United States Patent
Byun et al.

(10) Patent No.: US 9,478,774 B2
(45) Date of Patent: Oct. 25, 2016

(54) RECHARGEABLE BATTERY

(75) Inventors: Sang-Won Byun, Yongin-si (KR);
Hae-Kwon Yoon, Yongin-si (KR);
Min-Yeol Han, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 559 days.

(21) Appl. No.: 13/077,640

(22) Filed: Mar. 31, 2011

(65) Prior Publication Data

US 2012/0141845 A1 Jun. 7, 2012

Related U.S. Application Data (60) Provisional application No. 61/419,221, filed on Dec. 2, 2010.

(51) Int. Cl.
| | |
|---|---|
| H01M 10/42 | (2006.01) |
| H01M 2/02 | (2006.01) |
| H01M 2/30 | (2006.01) |
| H01M 2/04 | (2006.01) |
| H01M 2/22 | (2006.01) |
| H01M 10/04 | (2006.01) |

(52) U.S. Cl.
CPC ............ *H01M 2/043* (2013.01); *H01M 2/22* (2013.01); *H01M 2/30* (2013.01); *H01M 10/0431* (2013.01); *H01M 10/42* (2013.01); *H01M 2/305* (2013.01)

(58) Field of Classification Search
CPC ........... H01M 2/04; H01M 2/30; H01M 2/34

USPC .............. 429/56, 61, 82, 163, 174, 178, 179
See application file for complete search history.

(56) References Cited

U.S. PATENT DOCUMENTS

| | | |
|---|---|---|
| 4,209,571 A | 6/1980 | Bessett et al. |
| 4,945,014 A | 7/1990 | Miyabayashi et al. |

(Continued)

FOREIGN PATENT DOCUMENTS

| | | |
|---|---|---|
| CN | 1395328 A | 2/2003 |
| CN | 1481039 A | 3/2004 |

(Continued)

OTHER PUBLICATIONS

Extended European Search Report dated Feb. 19, 2012 for corresponding EP Application 11165265.7, 5 pages.

(Continued)

*Primary Examiner* — Daniel Gatewood
(74) *Attorney, Agent, or Firm* — Lewis Roca Rothgerber Christie LLP (57) ABSTRACT

A rechargeable battery having an improved penetration characteristic of an external short-circuit current in an electrode assembly by reducing an external short-circuit current. A rechargeable battery including an electrode assembly including a first electrode, a second electrode, and a separator between the first electrode and the second electrode; a case containing the electrode assembly; a cap plate covering an opening of the case; an electrode terminal protruding outside the case and electrically connected to the second electrode; and a resistance member between and electrically connecting the electrode terminal and the cap plate.

17 Claims, 8 Drawing Sheets

(56) References Cited

U.S. PATENT DOCUMENTS

| | | | |
|---|---|---|---|
| 5,143,860 A | 9/1992 | Mitchell et al. | |
| 5,523,178 A * | 6/1996 | Murakami | H01M 2/10 |
| | | | 429/53 |
| 5,707,756 A | 1/1998 | Inoue et al. | |
| 5,766,793 A | 6/1998 | Kameishi et al. | |
| 5,800,937 A | 9/1998 | Decker et al. | |
| 6,005,469 A | 12/1999 | Kalapodis et al. | |
| 6,083,792 A | 7/2000 | Sung | |
| 6,143,440 A | 11/2000 | Volz et al. | |
| 6,342,826 B1 | 1/2002 | Quinn et al. | |
| 6,399,237 B1 | 6/2002 | Souliac et al. | |
| 6,403,250 B1 | 6/2002 | Azema et al. | |
| 6,509,115 B2 | 1/2003 | Kim et al. | |
| 6,525,371 B2 | 2/2003 | Johnson et al. | |
| 6,562,493 B2 * | 5/2003 | Tsukada et al. | 429/7 |
| 6,642,110 B2 | 11/2003 | Jung et al. | |
| 6,753,104 B2 | 6/2004 | Kitoh | |
| 6,899,972 B2 | 5/2005 | Cho | |
| 7,351,496 B2 * | 4/2008 | Nakanishi et al. | 429/164 |
| 7,601,455 B2 | 10/2009 | Yoon | |
| 7,666,544 B2 | 2/2010 | Barrault et al. | |
| 8,043,737 B2 | 10/2011 | Kim | |
| 8,415,052 B2 | 4/2013 | Yoshida et al. | |
| 2002/0052080 A1 | 5/2002 | Lee | |
| 2002/0142543 A1 | 10/2002 | Lin et al. | |
| 2003/0013005 A1 | 1/2003 | Chang | |
| 2003/0027036 A1 | 2/2003 | Emori et al. | |
| 2003/0027044 A1 | 2/2003 | Asahina et al. | |
| 2003/0151868 A1 | 8/2003 | Inae et al. | |
| 2004/0092167 A1 | 5/2004 | Barrault et al. | |
| 2004/0126650 A1 | 7/2004 | Kim | |
| 2004/0170887 A1 | 9/2004 | Masumoto et al. | |
| 2004/0234842 A1 | 11/2004 | Kawano et al. | |
| 2005/0112455 A1 | 5/2005 | Marubayashi et al. | |
| 2005/0112456 A1 | 5/2005 | Kozu et al. | |
| 2005/0124133 A1 | 6/2005 | Tu | |
| 2005/0269622 A1 | 12/2005 | Klinger et al. | |
| 2006/0099500 A1 | 5/2006 | Jeon | |
| 2007/0077706 A1 | 4/2007 | Orlowski et al. | |
| 2007/0122691 A1 | 5/2007 | Lee et al. | |
| 2007/0166605 A1 | 7/2007 | Meguro et al. | |
| 2007/0182020 A1 | 8/2007 | Trezza et al. | |
| 2007/0212595 A1 * | 9/2007 | Kim et al. | 429/53 |
| 2007/0269711 A1 | 11/2007 | Meguro et al. | |
| 2008/0070067 A1 | 3/2008 | Jang et al. | |
| 2008/0145748 A1 | 6/2008 | Jung | |
| 2008/0213657 A1 | 9/2008 | Qi et al. | |
| 2009/0087733 A1 | 4/2009 | Yoon et al. | |
| 2009/0305126 A1 | 12/2009 | Choi et al. | |
| 2010/0028762 A1 | 2/2010 | Yokoyama et al. | |
| 2010/0081048 A1 | 4/2010 | Nansaka et al. | |
| 2010/0136388 A1 | 6/2010 | Kim et al. | |
| 2010/0167107 A1 | 7/2010 | Byun et al. | |
| 2010/0227205 A1 | 9/2010 | Byun et al. | |
| 2010/0279156 A1 * | 11/2010 | Kim et al. | 429/56 |
| 2010/0291421 A1 | 11/2010 | Byun et al. | |
| 2011/0039136 A1 | 2/2011 | Byun et al. | |
| 2011/0052949 A1 | 3/2011 | Byun et al. | |
| 2011/0135976 A1 | 6/2011 | Byun | |
| 2011/0177387 A1 | 7/2011 | Byun et al. | |
| 2011/0183193 A1 | 7/2011 | Byun et al. | |
| 2011/0244280 A1 | 10/2011 | Byun et al. | |

FOREIGN PATENT DOCUMENTS

| | | |
|---|---|---|
| EP | 0 313 405 A1 | 4/1989 |
| EP | 1 076 350 A2 | 2/2001 |
| EP | 1076350 A2 * | 2/2001 |
| EP | 1 717 886 A2 | 11/2006 |
| EP | 1 901 369 A1 | 3/2008 |
| EP | 2 284 932 A1 | 2/2011 |
| EP | 2 287 942 A1 | 2/2011 |
| EP | 2 299 512 A1 | 3/2011 |
| EP | 2 333 871 A1 | 6/2011 |
| EP | 2 348 558 A1 | 7/2011 |
| EP | 2 357 685 A1 | 8/2011 |
| JP | 05-062664 | 3/1993 |
| JP | 05-251290 | 9/1993 |
| JP | 05-275088 | 10/1993 |
| JP | 06-290767 | 10/1994 |
| JP | 07-037572 | 2/1995 |
| JP | 07-201372 | 8/1995 |
| JP | 07201372 A * | 8/1995 |
| JP | 08-050920 | 2/1996 |
| JP | 08-185850 | 7/1996 |
| JP | 09-106804 | 4/1997 |
| JP | 10-074500 | 3/1998 |
| JP | 10-188946 | 7/1998 |
| JP | 10-208725 | 8/1998 |
| JP | 10-326610 | 12/1998 |
| JP | 11-007931 | 1/1999 |
| JP | 11-040203 | 2/1999 |
| JP | 11040203 A * | 2/1999 |
| JP | 11-273651 | 10/1999 |
| JP | 11-307076 | 11/1999 |
| JP | 2000-082457 | 3/2000 |
| JP | 2000-182598 | 6/2000 |
| JP | 2000-235872 | 8/2000 |
| JP | 2001-202946 | 7/2001 |
| JP | 2001-357834 | 12/2001 |
| JP | 2002-216743 | 8/2002 |
| JP | 2003-051303 | 2/2003 |
| JP | 2003-051304 | 2/2003 |
| JP | 2003-092103 | 3/2003 |
| JP | 2003-178745 | 6/2003 |
| JP | 2003-197178 | 7/2003 |
| JP | 2003-223886 | 8/2003 |
| JP | 2003-308815 | 10/2003 |
| JP | 2004-022477 | 1/2004 |
| JP | 2004-087194 | 3/2004 |
| JP | 2004087194 A * | 3/2004 |
| JP | 2004-521459 | 7/2004 |
| JP | 2004-273139 | 9/2004 |
| JP | 2004-319463 A | 11/2004 |
| JP | 2004319463 A * | 11/2004 |
| JP | 2005-032477 | 2/2005 |
| JP | 2005-044626 | 2/2005 |
| JP | 2005-166584 | 6/2005 |
| JP | 2006-012602 | 1/2006 |
| JP | 2006-147180 | 6/2006 |
| JP | 2008-027668 | 2/2008 |
| JP | 2008-177084 | 7/2008 |
| JP | 2008-186591 | 8/2008 |
| JP | 2008-218132 | 9/2008 |
| JP | 2009-105075 | 5/2009 |
| JP | 2010-097822 | 4/2010 |
| JP | 2011-018645 | 1/2011 |
| JP | 2011-124214 | 6/2011 |
| JP | 2011-154991 | 8/2011 |
| JP | 2011-210717 | 10/2011 |
| JP | 2010-033777 | 2/2013 |
| KR | 10-1999-0031054 U | 7/1999 |
| KR | 10-2001-0011900 | 2/2001 |
| KR | 10-2001-0021236 | 3/2001 |
| KR | 2002-0021887 | 3/2002 |
| KR | 10-2006-0020211 | 3/2006 |
| KR | 10-2006-0039955 | 5/2006 |
| KR | 10-0693115 B1 | 3/2007 |
| KR | 10-2007-0122471 | 12/2007 |
| KR | 10-0870349 B1 | 11/2008 |
| KR | 10-2010-0036164 | 4/2010 |
| KR | 10-2010-0052885 | 5/2010 |
| KR | 10-2010-0055998 | 6/2010 |
| KR | 10-2010-0062886 | 6/2010 |
| KR | 10-2010-0076699 | 7/2010 |
| KR | 10-2010-0088021 | 8/2010 |
| KR | 10-2010-0099983 | 9/2010 |
| KR | 10-2010-0123598 | 11/2010 |
| KR | 10-2011-0005197 | 1/2011 |
| KR | 10-2011-0017820 | 2/2011 |
| KR | 10-2011-0025056 | 3/2011 |
| KR | 10-2011-0030043 | 3/2011 |

(56) References Cited

FOREIGN PATENT DOCUMENTS

| KR | 10-1042808 B1 | 6/2011 |
| WO | WO 02/071510 A1 | 9/2002 |
| WO | WO 2007/126243 A1 | 11/2007 |

OTHER PUBLICATIONS

U.S. Appl. No. 12/909,799, filed Oct. 21, 2010, Kwak et al. (not yet published).
Patent Abstracts of Japan, and English machine translation of Japanese Publication 07-037572, listed above, 5 pages.
KIPO Office action dated Aug. 13, 2012, for corresponding Korean Patent application 10-2011-0036267, (4 pages).
Patent Abstracts of Japan, and English machine translation of Japanese Publication 11-273651 listed above, (12 pages).
Patent Abstracts of Japan, and English machine translation of Japanese Publication 2004-087194 listed above, (10 pages).
JPO Office action dated Jun. 4, 2013, for corresponding Japanese Patent application 2011-170959, (3 pages).
Patent Abstracts of Japan, and English machine translation of Japanese Publication 07-201372 dated Aug. 4, 1995, listed above, (5 pages).
Patent Abstracts of Japan, and English machine translation of Japanese Publication 2004-022477 dated Jan. 22, 2004, listed above, (7 pages).
Patent Abstracts of Japan, and English machine translation of Japanese Publication 2005-044626 dated Feb. 17, 2005, listed above, (11 pages).
Patent Abstracts of Japan, and English machine translation of Japanese Publication 2008-186591 dated Aug. 14, 2008, listed above, (14 pages).
Patent Abstracts of Japan, and English machine translation of Japanese Publication 2010-033777 dated Feb. 12, 2010, listed above, (16 pages).
SIPO Office Action dated Dec. 4, 2013 issued in Application No. 201110207662, 20 pages.
KIPO Letters Patent dated Dec. 15, 2011 for Korean Patent application 10-2009-0116065, (11 pages).
KIPO Office action dated Jan. 17, 2012 for Korean Patent application 10-2010-0068019, (9 pages).
KIPO Office action dated Mar. 19, 2012 for Korean Patent application 10-2010-0062270, (5 pages).
KIPO Office action dated Jun. 18, 2012 for Korean Patent application 10-2011-0003951, (4 pages).
KIPO Office action dated Oct. 8, 2012, for Korean Patent application 10-2011-0050510, (4 pages).
KIPO Office action dated Apr. 4, 2012, for Korean Patent application 10-2010-0062874, (5 pages).
KIPO Notice of Allowance dated Oct. 26, 2012, for Korean Patent application 10-2010-0052011, (5 pages).
KIPO Notice of Allowance dated Dec. 4, 2012, for Korean Patent application 10-2011-0003951, (5 pages).
KIPO Notice of Allowance dated Mar. 27, 2013, for Korean Patent application 10-2011-0050510, (5 pages).
EPO Office action dated Apr. 20, 2011 for European Patent application 10167890.2, (6 pages).
EPO Search Report dated Oct. 13, 2010 for European Patent application 10169791, (6 pages).
EPO Office action dated Apr. 21, 2011 for European Patent application 10169791, (6 pages).
EPO Office action dated Feb. 8, 2011 for European Patent application 10168526.1, (4 pages).
EPO Search Report dated Aug. 16, 2010 for European Patent application 10168526.1, (6 pages).
EPO Search Report dated Sep. 28, 2012 for European Patent application 12179697.3, (6 pages).
EPO Search Report dated Dec. 20, 2012 for European Patent application 12178835.0, (6 pages).
EPO Search Report dated Oct. 2, 2012 for European Patent application 11178263.7, (7 pages).
EPO Search Report dated Aug. 19, 2010 for European Patent application 10167890.2, (7 pages).
EPO Search Report dated Aug. 19, 2010 for European Patent application 10164550.5 (8 pages).
EPO Office action dated Mar. 7, 2011 for European Patent application 10164550.5 (5 pages).
EPO Office action dated Aug. 17, 2011 for European Patent application 10164550.5 (8 pages).
EPO Search Report dated Dec. 14, 2012 for European Patent application 12160354.2, (5 pages).
EPO Search Report dated Sep. 29, 2011 for European Patent application 11169286.9, (5 pages).
EPO Office action dated Mar. 22, 2012 for European Patent application 10164550.5 (4 pages).
EPO Office action dated Jul. 19, 2011 for European Patent application 10170406.2 (3 pages).
JPO Office action dated Feb. 5, 2013, for Japanese Patent application 2010-154142, (2 pages).
JPO Office action dated Aug. 28, 2012, for Japanese Patent application 2010-170281, (2 pages).
JPO Office action dated Apr. 30, 2013, for Japanese Patent application 2011-115662, (2 pages).
JPO Office action dated Sep. 24, 2013, for Japanese Patent application 2011-170959, (3 pages).
SIPO Office action dated Aug. 27, 2012, with English translation, for Chinese application 201010135715.X, (16 pages).
SIPO Office action dated Apr. 12, 2013, with English translation, for Chinese Patent application 201010135715.X, (20 pages).
SIPO Office action dated Aug. 6, 2013, with English translation for Chinese Patent application 201010135715.X, (20 pages).
SIPO Office action dated Jul. 15, 2013, with English translation for Chinese Patent application 201010220632.0, (10 pages).
SIPO Office action dated Jan. 22, 2013, with English translation for Chinese Patent application 201010220632.0, (20 pages).
Korean Patent Abstracts for Korean Publication 10-2008-0084416 dated Sep. 19, 2008, corresponding to Korean Patent 10-0870349 dated Nov. 25, 2008, listed above.
U.S. Office action dated Aug. 17, 2010, for cross reference U.S. Appl. No. 12/626,582, (11 pages).
U.S. Office action dated Nov. 23, 2010, for cross reference U.S. Appl. No. 12/626,582, (10 pages).
U.S. Notice of Allowance dated Sep. 23, 2013, for cross reference U.S. Appl. No. 13/210,124, (15 pages).
U.S. Office action dated Feb. 1, 2013, for cross reference U.S. Appl. No. 12/781,656, (17 pages).
U.S. Office action dated Jul. 3, 2013, for cross reference U.S. Appl. No. 12/781,656, (15 pages).
U.S. Office action dated Jun. 21, 2013, for cross reference U.S. Appl. No. 13/137,460, (25 pages).
U.S. Office action dated Dec. 21, 2012, for cross reference U.S. Appl. No. 12/656,085, (28 pages).
Patent Abstracts of Japan, and English machine translation of Japanese Publication 05-062664, dated Mar. 12, 1993, (11 pages).
Patent Abstracts of Japan, and English machine translation of Japanese Publication 05-251290, dated, (5 pages).
Patent Abstracts of Japan, and English machine translation of Japanese Publication 05-257088, dated, (6 pages).
Patent Abstracts of Japan, and English machine translation of Japanese Publication 06-290767, dated Oct. 18, 1994, (13 pages).
Patent Abstracts of Japan, and English machine translation of Japanese Publication 08-050920, dated, (14 pages).
Patent Abstracts of Japan, and English machine translation of Japanese Publication 08-185850, dated, (11 pages), also Corresponds to U.S. Pat. No. 6,753,104 listed above.
Patent Abstracts of Japan, and English machine translation of Japanese Publication 10-326610, dated , (10 pages).
Patent Abstracts of Japan, and English machine translation of Japanese Publication 10-188946, dated , (8 pages), also Corresponds to U.S. Pat. No. 7,666,544 listed above.
Patent Abstracts of Japan, and English machine translation of Japanese Publication 11-040203, dated , (12 pages).

(56) References Cited

OTHER PUBLICATIONS

Patent Abstracts of Japan, and English machine translation of Japanese Publication 11-307076, dated, (6 pages).
Patent Abstracts of Japan, and English machine translation of Japanese Publication 2000-082457, dated Mar. 21, 2000, (13 pages).
Patent Abstracts of Japan, and English machine translation of Japanese Publication 2000-182598, dated , (21 pages).
Patent Abstracts of Japan, and English machine translation of Japanese Publication 2001-202946, dated , (8 pages).
Patent Abstracts of Japan, and English machine translation of Japanese Publication 2001-357834, dated , (15 pages).
Patent Abstracts of Japan, and English machine translation of Japanese Publication 2002-216743, dated, (10 pages).
Patent Abstracts of Japan, and English machine translation of Japanese Publication 2003-051304, dated , (19 pages).
Patent Abstracts of Japan, and English machine translation of Japanese Publication 2003-092103, dated , (18 pages).
Patent Abstracts of Japan, and English machine translation of Japanese Publication 2003-197178 dated Jul. 11, 2003, (12 pages).
Patent Abstracts of Japan, and English machine translation of Japanese Publication 2003-223886, dated , (10 pages).
Patent Abstracts of Japan, and English machine translation of Japanese Publication 2004-273139, dated , (24 pages).
Patent Abstracts of Japan, and English machine translation of Japanese Publication 2005-032477, dated, (21 pages).
Patent Abstracts of Japan, and English machine translation of Japanese Publication 2006-012602, dated , (10 pages).
Patent Abstracts of Japan, and English machine translation of Japanese Publication 2008-027668, dated, (13 pages).
Patent Abstracts of Japan, and English machine translation of Japanese Publication 2008-177084, dated , (11 pages).
Patent Abstracts of Japan, and English machine translation of Japanese Publication 2008-218132, Sep. 18, 2008, (10 pages).
Patent Abstracts of Japan, and English machine translation of Japanese Publication 2009-105075, dated , (10 pages).
Patent Abstracts of Japan, and English machine translation of Japanese Publication 2010-097822, dated , (24 pages).
Patent Abstracts of Japan, and English machine translation of Japanese Publication 2011-018645, dated Jan. 27, 2011, (15 pages).
SIPO Office action dated Oct. 8, 2014, with English translation, for corresponding Chinese Patent application 201110207662.2, (18 pages).
KIPO Office action dated Nov. 20, 2012 for Korean Patent application 10-2011-0073880, (8 pages).
U.S. Notice of Allowance dated Jun. 27, 2014, for cross reference U.S. Appl. No. 12/781,656, (7 pages).
U.S. Notice of Allowability dated Aug. 19, 2014, for cross reference U.S. Appl. No. 12/781,656, (2 pages).
U.S. Notice of Allowance dated Aug. 28, 2014, for cross reference U.S. Appl. No. 13/563,028, (9 pages).
U.S. Office action dated Oct. 16, 2014, for cross reference U.S. Appl. No. 12/626,582, (18 pages).
U.S. Office action dated Oct. 21, 2014, for cross reference U.S. Appl. No. 13/396,463, (27 pages).
SIPO Office action dated May 19, 2014, with English translation, for corresponding Chinese Patent application 201110207662.2, (16 pages).
U.S. Office action dated Oct. 1, 2013, for cross reference U.S. Appl. No. 13/396,463, (15 pages).
U.S. Office action dated Oct. 8, 2013, for cross reference U.S. Appl. No. 13/563,028, (16 pages).
U.S. Office action dated Nov. 14, 2013, for cross reference U.S. Appl. No. 12/781,656, (20 pages).
U.S. Notice of Allowance dated Jan. 29, 2014, for cross reference U.S. Appl. No. 12/781,656, (7 pages).
U.S. Notice of Allowance dated Mar. 20, 2014, for cross reference U.S. Appl. No. 12/781,656, (14 pages).
U.S. Office action dated Apr. 8, 2014, for cross reference U.S. Appl. No. 13/396,463, (7 pages).
U.S. Notice of Allowance dated Apr. 30, 2014, for cross reference U.S. Appl. No. 13/563,028, (27 pages).
U.S. Office action dated May 20, 2014, for cross reference U.S. Appl. No. 12/626,582, (26 pages).
U.S. Office action dated May 6, 2011, for cross reference U.S. Appl. No. 12/634,000, (9 pages).
U.S. Office action dated Sep. 2, 2011, for cross reference U.S. Appl. No. 12/634,000, (14 pages).
U.S. Office action dated Jan. 9, 2012, for cross reference U.S. Appl. No. 12/634,000, (11 pages).
U.S. Notice of Allowance dated Apr. 13, 2012, for cross reference U.S. Appl. No. 12/634,000, (10 pages).
U.S. Notice of Allowance dated Dec. 4, 2014, for cross reference U.S. Appl. No. 13/563,028, (9 pages).
U.S. Notice of Allowance dated Dec. 19, 2014, for cross reference U.S. Appl. No. 13/333,869, (21 pages).
SIPO Reexamination Office Action dated Dec. 22, 2014, with English translation, for related Chinese Patent Application No. 201010135715.X, (15 pages).
U.S. Office action dated Apr. 23, 2015, for cross reference U.S. Appl. No. 13/396,463, (20 pages).
U.S. Office action dated Jun. 8, 2015, for cross reference U.S. Appl. No. 12/626,582, (10 pages).
EPO Office action dated Aug. 14, 2015 for European Patent application 12178835.0, (5 pages).
SIPO Office action dated Jul. 6, 2015 for Chinese Patent application 201010135715.X, (10 pages).
U.S. Notice of Allowance dated Sep. 18, 2015, for cross reference U.S. Appl. No. 12/626,582, (10 pages).
U.S. Office action dated Nov. 6, 2015, for cross reference U.S. Appl. No. 13/396,463, (20 pages).
SIPO Office action dated Oct. 10, 2015, with English translation, corresponding to Chinese Patent application 201210308716.9, (10 pages).
SIPO Office action dated Mar. 25, 2015, with English translation, for Chinese Patent application 201010135715.X, (14 pages).
SIPO Office action dated Mar. 26, 2015, with English translation, for Chinese Patent application 201110207662.2, (6 pages).
KIPO Notice of Allowance dated Mar. 11, 2016, corresponding to Korean Patent application 10-2011-0105428, (5 pages).
KIPO Office action dated Mar. 19, 2016, corresponding to Korean Patent application 10-2011-0120472, (6 pages).
English machine translation of Japanese Publication 2000-235872 dated Aug. 29, 2000 listed above, (9 pages).
U.S. Notice of Allowance dated Feb. 5, 2015, for cross reference U.S. Appl. No. 13/563,028, (8 pages).
U.S. Office action dated Jun. 8, 2015, for cross reference U.S. Appl. No. 12/626,582 (10 pages).
U.S. Advisory action dated Feb. 18, 2016, for cross reference U.S. Appl. No. 13/396,463, (4 pages).

\* cited by examiner

RECHARGEABLE BATTERY

CROSS-REFERENCE TO RELATED APPLICATION

This application claims the benefit of U.S. Provisional Application No. 61/419,221, filed on Dec. 2, 2010 in the United States Patent and Trademark Office, the disclosure of which is incorporated herein in its entirety by reference.

BACKGROUND

1. Field

Aspects of embodiments of the present invention relate to a rechargeable battery.

2. Description of the Related Art

Unlike a primary battery, a rechargeable battery is capable of being charged and discharged repeatedly. A small capacity rechargeable battery may be used for a small electronic device such as a mobile phone, a laptop computer, and a camcorder. A large capacity rechargeable battery may be used as a power source for driving a motor of a hybrid vehicle, for example.

Recently, a high power rechargeable battery using high energy density non-aqueous electrolyte has been developed. The high power rechargeable battery may be used for a device requiring high power, such as a driving motor of an electric vehicle.

The rechargeable battery includes an electrode assembly, a case housing the electrode assembly, a cap plate for closing and sealing an opening of the case, and an electrode terminal penetrating the cap plate and electrically connected to the electrode assembly. Here, the electrode assembly is formed by winding a positive electrode and a negative electrode with a separator interposed therebetween.

Since the rechargeable battery is charged and discharged repeatedly, heat may be excessively generated inside the case, and the electrolyte solution may decompose. Such heat generation or electrolyte solution decomposition may increase the internal pressure of the rechargeable battery. The increase of the internal pressure may cause ignition and explosion of the rechargeable battery. In order to prevent the ignition and the explosion caused by the increase of the internal pressure, an external short-circuit unit may be disposed at an outside of the case.

The external short-circuit unit shorts the positive electrode and the negative electrode of the electrode assembly from the outside of the rechargeable battery when the internal pressure of the rechargeable battery increases, thereby reducing a state of charge of the electrode assembly. However, the external short-circuit current may excessively penetrate the electrode assembly because the external short-circuit resistance value is small. Therefore, a safety problem may be caused in the electrode assembly.

The above information disclosed in this Background section is only for enhancement of understanding of the background of the invention and therefore it may contain information that does not form the prior art that is already known in this country to a person of ordinary skill in the art.

SUMMARY

According to an aspect of embodiments of the present invention, a rechargeable battery has an improved penetration characteristic of an external short-circuit current in an electrode assembly by reducing an external short-circuit current in a case of an external short-circuit.

According to an exemplary embodiment of the present invention, a rechargeable battery includes: an electrode assembly including a first electrode, a second electrode, and a separator between the first electrode and the second electrode; a case containing the electrode assembly; a cap plate covering an opening of the case; an electrode terminal protruding outside the case and electrically connected to the second electrode; and a resistance member between and electrically connecting the electrode terminal and the cap plate.

In one embodiment, a resistance of the resistance member is greater than a resistance of the electrode terminal.

In one embodiment, the electrode terminal includes a column unit protruding through an opening of the cap plate, and a terminal plate coupled to the column unit outside the case, and the resistance member electrically connects the electrode terminal and the cap plate at the terminal plate. The rechargeable battery may further include an insulating gasket surrounding the column unit and insulating the column unit from each of the cap plate and the resistance member. The resistance member may include a first protrusion coupled to the cap plate in a groove of the cap plate, and a second protrusion coupled to the terminal plate in a groove of the terminal plate. A resistance of the resistance member may be greater than a resistance of at least one of the column unit, the terminal plate, or the cap plate.

The resistance member may include at least one of steel, stainless steel, or a nickel steel alloy.

In one embodiment, the resistance member includes a body, and a layer on the body. The body may include steel, stainless steel, or a nickel steel alloy, and the layer may include at least one of nickel or tin. A resistance of the body and the layer may be greater than a resistance of at least one of the electrode terminal or the cap plate.

In one embodiment, the resistance member includes a first resistance unit contacting the cap plate, and a second resistance unit contacting the electrode terminal. The first resistance unit may include a first material, and the second resistance unit may include a second material having a resistance different than a resistance of the first material. In one embodiment, one of the first and second resistance units includes steel, stainless steel, or a nickel steel alloy, and the other of the first and second resistance units includes aluminum. In one embodiment, the first resistance unit includes a first protrusion coupled to the cap plate in a groove of the cap plate, and the second resistance unit includes a second protrusion coupled to the electrode terminal in a groove of the electrode terminal. A resistance of at least one of the first resistance unit or the second resistance unit may be greater than a resistance of at least one of the electrode terminal or the cap plate.

In one embodiment, a rechargeable battery further includes a short-circuit tab electrically coupled to the first electrode; and a deformable plate electrically coupled to the second electrode and configured to deform and contact the short-circuit tab for short circuiting the first electrode and the second electrode when an internal pressure of the rechargeable battery exceeds a reference pressure. The rechargeable battery may further include an insulating member between the cap plate and the short-circuit tab and having an opening over the deformable plate, the deformable plate protruding through the opening to contact the short-circuit tab when the internal pressure of the rechargeable battery exceeds the reference pressure. A peripheral portion of the deformable plate may be attached to the cap plate, and an inner portion of the deformable plate inside the peripheral portion may be arranged within an opening of the cap plate.

In one embodiment, the rechargeable battery further includes another electrode terminal protruding outside the case and electrically connected to the first electrode, and the first electrode and the second electrode are short circuited through the resistance member, the cap plate, and the another electrode terminal when the deformable plate contacts the short-circuit tab. In one embodiment, a second electric connection path formed through the electrode terminal, the resistance member, and the cap plate when the deformable plate contacts the short-circuit tab has a resistance greater than a resistance of a first electric connection path through the electrode terminal.

According to another exemplary embodiment of the present invention, a rechargeable battery includes: an electrode assembly having a negative electrode (a first electrode), a positive electrode (a second electrode), and a separator; a case internally housing the electrode assembly; a cap plate connected at an opening of the case, a negative electrode terminal (a first terminal) and a positive electrode terminal (a second terminal) installed at the cap plate and respectively connected to the negative electrode and the positive electrode; a short-circuit tab connected to the negative electrode terminal; a deformable plate separated from the short-circuit tab and connected to the positive electrode terminal; and a resistance member disposed on an electric connection path between the short-circuit member and the positive electrode terminal and having an electrical resistance value higher than electrical resistance values of other elements on the electric connection path.

According to another exemplary embodiment of the present invention, the resistance member having high electrical resistance value is disposed on an electric connection path between the deformable plate and the positive electrode terminal. According to an aspect of embodiments of the present invention, the external short-circuit current is reduced by increasing the external short-circuit resistance value. Therefore, the penetration characteristic of the external short-circuit current penetrating the electrode assembly is improved.

BRIEF DESCRIPTION OF THE DRAWINGS

The above and other features and advantages will become more apparent to those of ordinary skill in the art by describing in detail some exemplary embodiments of the present invention with reference to the attached drawings. Moreover, additional aspects and/or advantages of embodiments of the present invention are set forth in the following description and accompanying drawings, or may be obvious in view thereof to those skilled in the art.

DESCRIPTION OF REFERENCE NUMERALS INDICATING SOME ELEMENTS IN THE DRAWINGS

| | |
|---|---|
| 10: electrode assembly | 11: first electrode |
| 11a, 12a: uncoated region | 12: second electrode |
| 13: separator | 15: case |
| 20: cap plate | 21: first electrode terminal |
| 22: second electrode terminal | 21a, 22a: column unit |
| 21b, 22b: flange | 21d, 22d: terminal plate |
| 23: short-circuit hole | 24: vent hole |
| 25: vent plate | 25a: notch |
| 27: sealing stopper | 29: electrolyte solution inlet |
| 31: first electrode lead tab | 36: first electrode gasket |
| 37: insulating member | 39: second electrode gasket |
| 51: short-circuit tab | 53: deformable plate |
| 70, 270, 370: resistance member | 71: downward protrusion |
| 72, 74: groove | 73: upward protrusion |
| 100, 200, 400: rechargeable battery | 271: main body |
| 272: plating layer | 371, 372: first and second resistance units |
| L1, L2: first and second connection paths | |

DETAILED DESCRIPTION

Hereinafter, the present invention will be described more fully hereinafter with reference to the accompanying drawings, in which some exemplary embodiments of the invention are shown. However, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
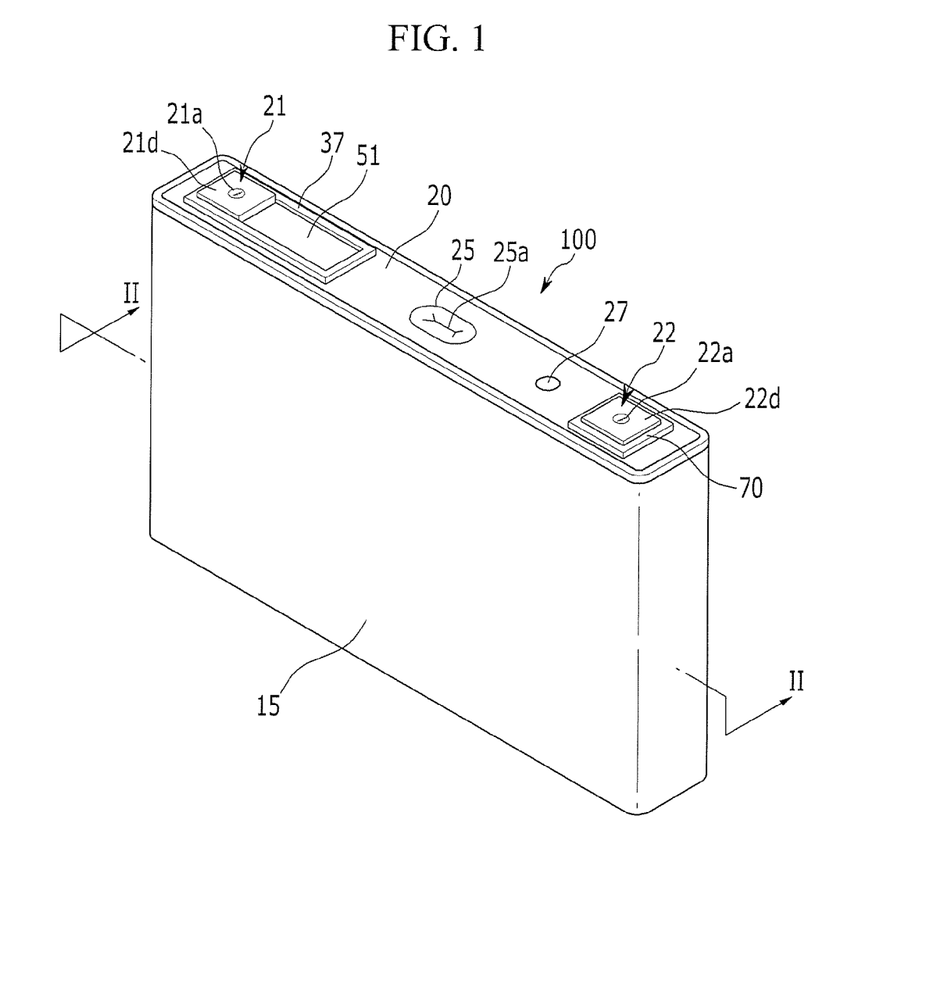
FIG. 1 is a perspective view of a rechargeable battery according to an exemplary embodiment of the present invention.
Figure 2:
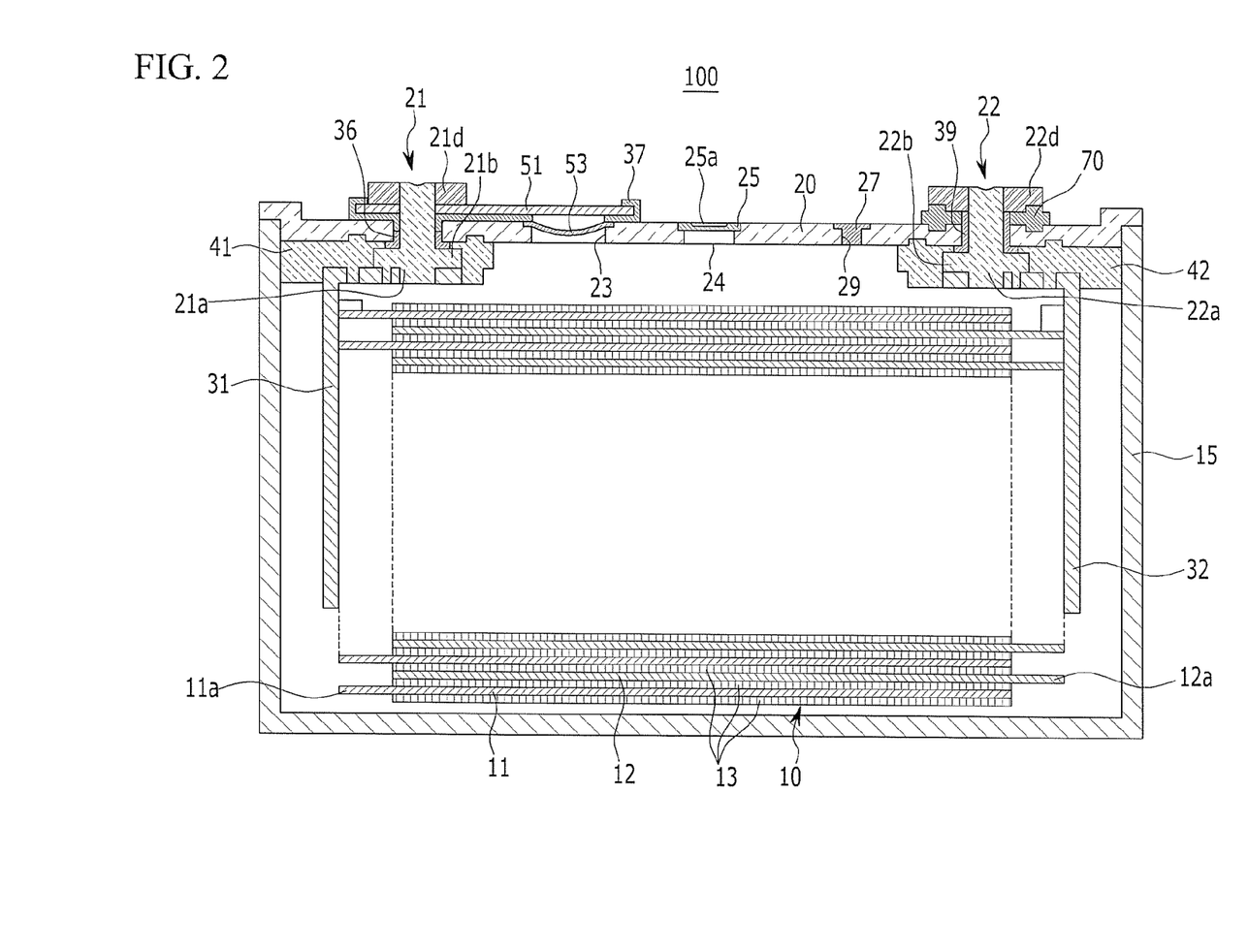
FIG. 2 is a cross-sectional view of the rechargeable battery of FIG. 1 taken along the line II-II.

FIG. 1 is a perspective view illustrating a rechargeable battery according to an exemplary embodiment of the present invention. FIG. 2 is a cross-sectional view of the rechargeable battery shown in FIG. 1 taken along the line II-II. Referring to FIG. 1 and FIG. 2, a rechargeable battery 100 according to an exemplary embodiment includes an electrode assembly 10, a case 15 housing the electrode assembly 10, a cap plate 20 connected to an opening of the case 15, a first electrode terminal 21 (e.g., a negative electrode terminal) connected to the cap plate 20, and a second electrode terminal 22 (e.g., a positive electrode terminal).

In one embodiment, the electrode assembly 10 is formed by disposing a first electrode 11 (e.g., a negative electrode) and a second electrode 12 (e.g., a positive electrode) at both sides of a separator 13, which is an insulator, and winding the first electrode 11, the separator 13, and the second electrode 12 in a jelly roll shape. Alternatively, the electrode assembly 10 may be assembled by stacking a negative electrode and a positive electrode formed of a single plate with a separator interleaved therebetween or assembled by folding and stacking the negative electrode, the separator, and the positive electrode in a zigzag manner (not shown).

The first electrode 11 and the second electrode 12 include coated regions formed of a metal plate current collector coated with active material, and uncoated regions 11a and 12a formed of an exposed current collector where active material is not coated. In one embodiment, the uncoated region 11a of the first electrode 11 is formed at one end of the first electrode 11 along the wound first electrode 11, and the uncoated region 12a of the second electrode 12 is formed at one end of the second electrode 12 along the wound second electrode 12. The uncoated regions 11a and 12a, in one embodiment, are disposed at both ends of the electrode assembly 10.

The case 15, in one embodiment, is formed having a cuboid shape to form an internal space for housing the electrode assembly 10 and electrolyte solution and includes an opening at one side of the cuboid to connect the outside and the inside. The opening permits the electrode assembly 10 to be inserted inside the case 15.

The cap plate 20, in one embodiment, is formed of a thin plate and is installed at the opening of the case 15 for closing and sealing the case 15. The cap plate 20, in one embodiment, further includes an electrolyte solution inlet 29 and a vent hole 24. The electrolyte solution inlet 29 permits injecting electrolyte solution inside the case 15 after connecting the cap plate 20 to the case 15. After injecting the electrolyte solution, the electrolyte solution inlet 29 is sealed with a sealing stopper 27.

The vent hole 24 permits discharging of internal pressure of the rechargeable battery 100. The vent hole 24 is closed and sealed with a vent plate 25. The vent plate 25 is opened when an internal pressure of the rechargeable battery 100 reaches a predetermined pressure. The vent plate 25, in one embodiment, includes a notch 25a to lead to an opening.

The first electrode terminal 21 and the second electrode terminal 22, in one embodiment, are installed by penetrating the cap plate 20 and are electrically connected to the electrode assembly 10. In one embodiment, the first electrode terminal 21 is electrically connected to the first electrode 11 of the electrode assembly 10, and the second electrode terminal 22 is electrically connected to the second electrode 12. Therefore, the electrode assembly 10 draws out to the outside of the case 15 through the first electrode terminal 21 and the second electrode terminal 22.

The first electrode terminal 21, in one embodiment, includes a column unit 21a installed at a terminal hole of the cap plate 20, a flange 21b formed from an inner side of the case 15 at the column unit 21a, and a terminal plate 21d disposed at an outer side of the case 15 and connected to the column unit 21a.

In one embodiment, a first electrode gasket 36 (e.g., a negative electrode gasket) is installed between the column unit 21a of the first electrode terminal 21 and an inner side of the terminal hole of the cap plate 20, thereby sealing between the column unit 21a of the first electrode terminal 21 and the cap plate 20. The first electrode gasket 36, in one embodiment, further extends between the flange 21b and the cap plate 20, thereby further sealing the flange 21b and the cap plate 20. That is, the first electrode gasket 36 prevents or substantially prevents electrolyte solution from leaking through the terminal hole where the first electrode terminal 21 is installed at the cap plate 20.

A first electrode lead tab 31 (e.g., a negative electrode lead tab) electrically connects the first electrode terminal 21 to the first electrode 11 of the electrode assembly 10. In one embodiment, the first electrode lead tab 31 is connected to a lower end of the column unit 21a for caulking the lower end. The first electrode lead tab 31 is connected to the lower end of the column unit 21a while being supported at the flange 21b. In one embodiment, a first electrode insulating member 41 (e.g., a negative electrode insulating member) is installed between the first electrode lead tab 31 and the cap plate 20 and electrically insulates the first electrode lead tab 31 and the cap plate 20.

Figure 3:
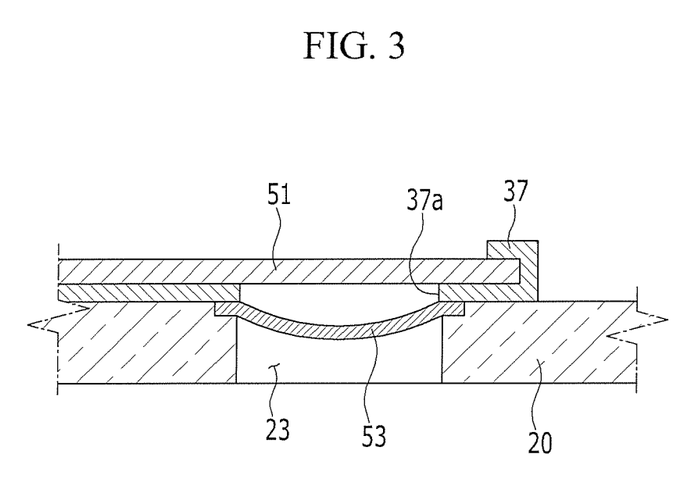
FIG. 3 is a cross-sectional view illustrating a separation state of a short-circuit tab and a deformable plate of the rechargeable battery of FIG. 1.
Figure 4:
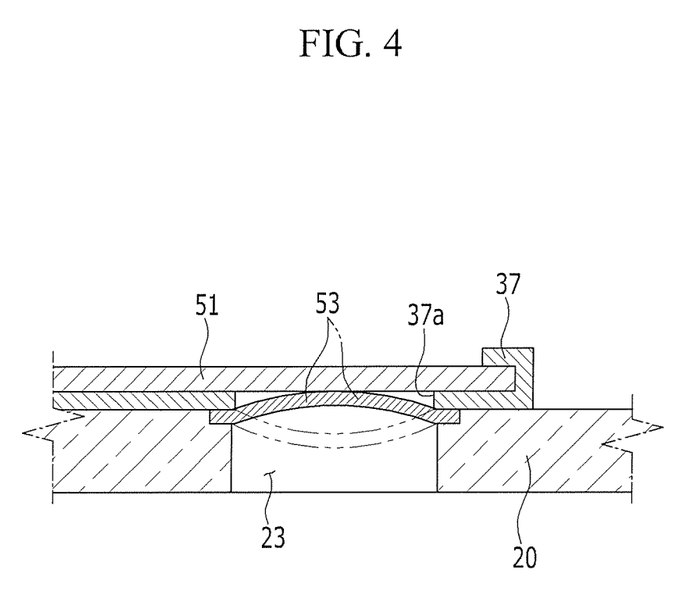
FIG. 4 is a cross-sectional view illustrating a short-circuit state of the short-circuit tab and the deformable plate of FIG. 3.

FIG. 3 is a cross-sectional view illustrating a separation state of a short-circuit tab and a deformable plate of the rechargeable battery 100. FIG. 4 is a cross-sectional view illustrating a short-circuit state of the short-circuit tab and the deformable plate shown in FIG. 3. Referring to FIG. 3 and FIG. 4, the rechargeable battery 100 according to an exemplary embodiment includes an external short-circuit unit installed at the first electrode terminal 21. The external short-circuit unit short circuits the first electrode 11 and the second electrode 12 from the outside of the case 15 when an internal pressure inside the case 15 increases. In one embodiment, the external short-circuit unit includes a short-circuit tab 51 and a deformable plate 53, which are separated or short-circuited according to the internal pressure.

Referring to FIG. 1 and FIG. 2 again, in one embodiment, the short-circuit tab 51 is disposed at the outside of the cap plate 20 and is electrically connected to the first electrode terminal 21. The short-circuit tab 51, in one embodiment, penetrates the column unit 21a from the outside of the case 15 and is stacked with the terminal plate 21d.

An insulating member 37 is installed between the short-circuit tab 51 and the cap plate 20 and electrically insulates the short-circuit tab 51 and the cap plate 20. The cap plate 20, in one embodiment, is electrically connected to the second electrode terminal 22.

The insulating member 37, in one embodiment, further extends between the column unit 21a of the first electrode terminal 21 and an inner side of the terminal hole of the cap plate 20 from the upper part of the first electrode gasket 36, thereby further electrically insulating between the column unit 21a of the first electrode terminal 21 and the cap plate 20.

The short-circuit tab 51 and the terminal plate 21d are connected to an upper part of the column unit 21a by caulking the upper part by stacking and coupling the short-circuit tab 51 and the terminal plate 21d at the upper part of the column unit 21a of the first electrode terminal 21. In one embodiment, the short-circuit tab 51 and the terminal plate 21d are supported by the cap plate 20 with the insulating member 37 interleaved between the short-circuit tab 51 and the cap plate 20.

The deformable plate 53 is deformed and contacts the short-circuit tab 51 when the internal pressure of the rechargeable battery 100 increases. When the deformable plate 53 contacts the short-circuit tab 51, the short-circuit tab 51 is electrically connected to the cap plate 21 so as to maintain the short-circuit state of the electrode assembly 10. For this purpose, the deformable plate 53 is installed at a short-circuit hole 23 of the cap plate 20. The short-circuit tab 51 is connected to the first electrode terminal 21 and extends toward the deformable plate 53. In the short-circuit hole 23, the short-circuit tab 51 and the deformable plate 53 face each other and sustain either a separation state (see FIG. 3) when the internal pressure of the rechargeable battery 100 is less than a reference pressure, or a short-circuit state (see FIG. 4) when the internal pressure is greater than a reference pressure.

In one embodiment, the deformable plate 53 is disposed between the insulating member 37 and the cap plate 20 in the short-circuit hole 23 and an insulating member hole 37a. The deformable plate 53, in one embodiment, is formed to have an arc-shaped cross-section that is convex toward the inner side of the case 15, and is electrically connected to the cap plate 20.

When the internal pressure of the case 15 increases, the deformable plate 53 is reversed and protruded to the outside of the cap plate 20 through the short-circuit hole 23 (see FIG. 4) and contacts and is electrically connected to the short-circuit tab 51, and the short-circuit tab 51 is therefore electrically connected to the cap plate 20. That is, the first electrode 11 of the electrode assembly 10 is short-circuited with the second electrode 12. When the first electrode 11 and the second electrode 21 are short-circuited, a large amount of current instantly flows between the first electrode terminal 21 and the second electrode terminal 22 through the short-circuit tab 51 and the second electrode terminal 22. Accordingly, the electrode assembly 10 is discharged.

The rechargeable battery 100 according to an exemplary embodiment further includes a structure that improves pass characteristic by reducing the external short-circuit current passing through the electrode assembly 10. The rechargeable battery 100 according to an exemplary embodiment has a configuration increasing an external short-circuit resistance value in order to reduce the external short-circuit current. In one embodiment, as shown in FIG. 2, the rechargeable battery 100 further includes a resistance member 70 disposed on an electric connection path of the deformable plate 53 and the second electrode terminal 22. The resistance member 70, in one embodiment, has a greater electrical resistance value than other constituent elements of the electric connection path.

Figure 5:
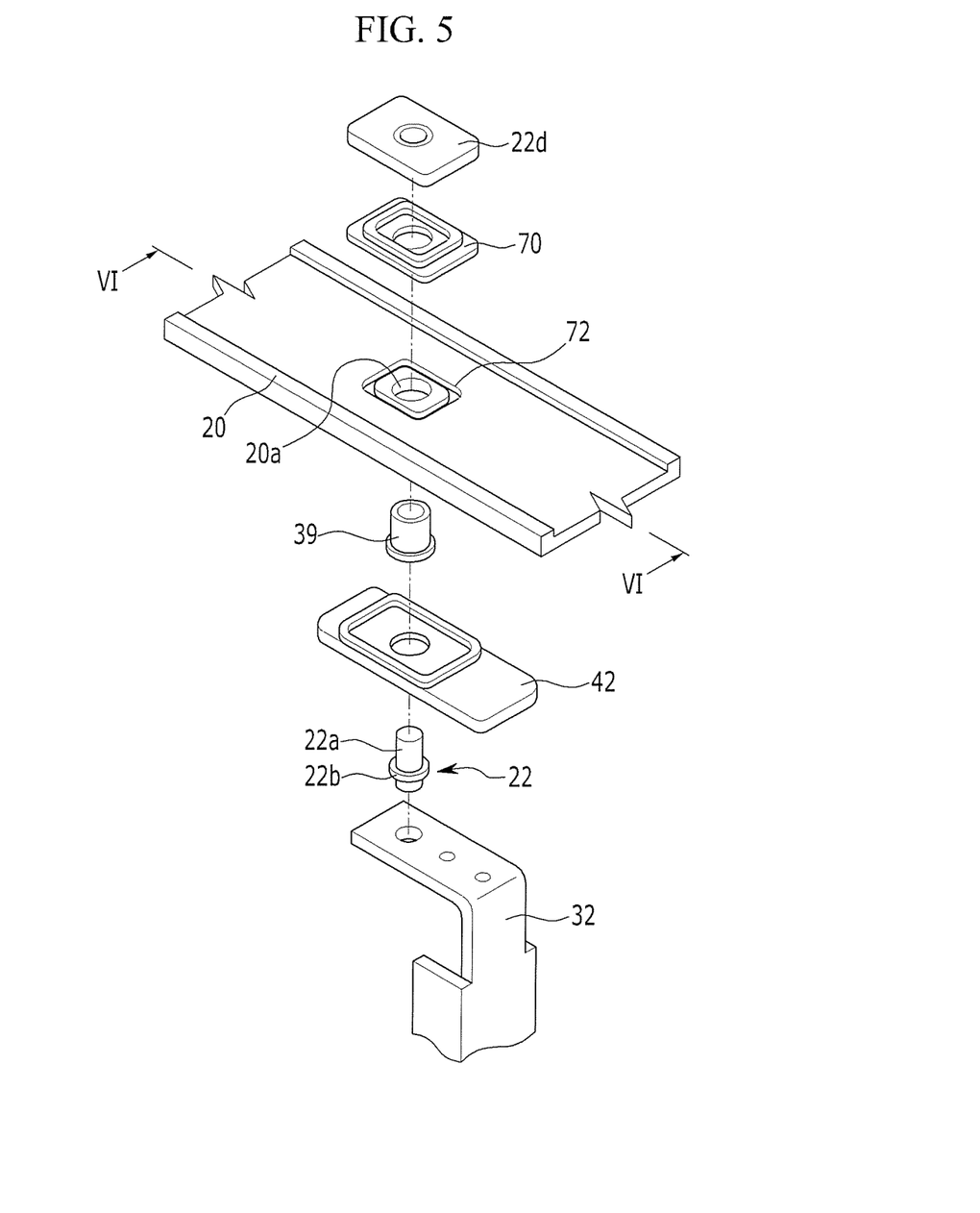
FIG. 5 is an exploded perspective view of an electrode terminal and a cap plate of the rechargeable battery of FIG. 1.

FIG. 5 is an exploded perspective view illustrating a disassembled state of an electrode terminal (e.g., a positive electrode terminal) and a cap plate of the rechargeable battery 100. Referring to FIG. 1, FIG. 2, and FIG. 5, the second electrode terminal 22 includes a column unit 22a installed at a terminal hole 20a of the cap plate 20, a flange 22b formed at the column unit 22a inside the case 15, and a resistance member 70 and a terminal plate 22d stacked and coupled at the column unit 22a and being disposed outside the case 15.

In one embodiment, a second electrode gasket 39 (e.g., a positive electrode gasket) is installed between the column unit 22a of the second electrode terminal 22 and an inner side of the terminal hole 20a of the cap plate 20, sealing between the column unit 22a of the second electrode terminal 22 and the cap plate 20. The second electrode gasket 39, in one embodiment, further extends between the flange 22b and the cap plate 20, thereby further sealing between the flange 22b and the cap plate 20. In one embodiment, the second electrode gasket 39 further extends between the column unit 22a of the second electrode terminal 22 and an inner side of a hole of the resistance member 70, thereby sealing between the column unit 22a of the second electrode terminal 22 and an inner side of a hole of the resistance member 70. The second electrode gasket 39 prevents or substantially prevents electrolyte solution from leaking through a terminal hole by installing the positive electrode terminal 22 at the cap plate 20.

A second electrode lead tab 32 (e.g., a positive electrode lead tab) electrically connects the second electrode terminal 22 to the electrode assembly 10. In one embodiment, the second electrode lead tab 32 is coupled to a lower end of the column unit 22a for caulking the lower end. Accordingly, the second electrode lead tab 32 is coupled to the lower end of the column 22a while being supported by the flange 22b. In one embodiment, a second electrode insulating member 42 (e.g., a positive electrode insulating member) is disposed between the second electrode lead tab 32 and the cap plate 20 and electrically insulates the second electrode lead tab 32 and the cap plate 20.

Figure 6:
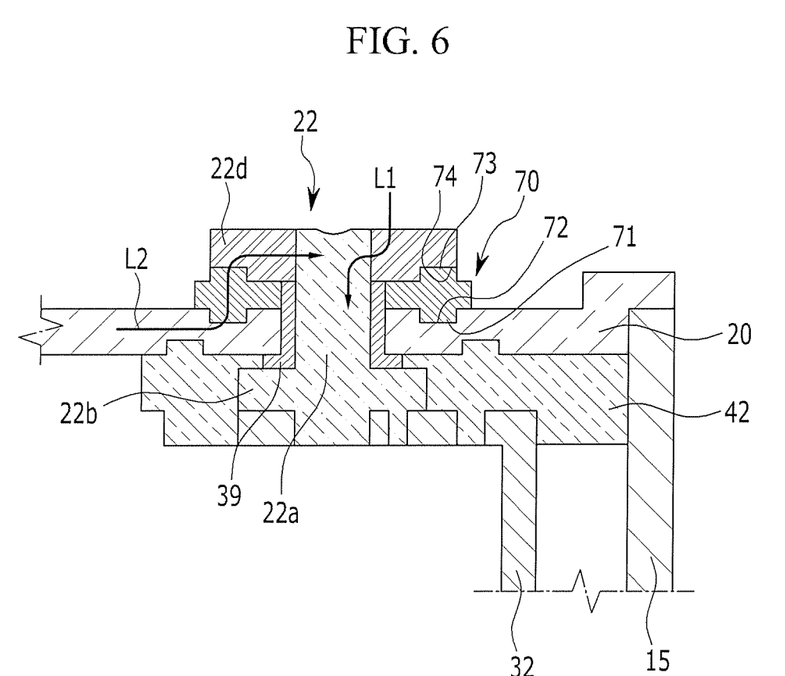
FIG. 6 is a cross-sectional view of the electrode terminal and the cap plate of FIG. 5 taken along the line VI-VI.

FIG. 6 is a cross-sectional view illustrating a connected state of the electrode terminal and the cap plate of FIG. 5 taken along the line VI-VI. Referring to FIG. 6, in one embodiment, the resistance member 70 and the terminal plate 22d are connected to an upper end of the column unit 22a by stacking and connecting the resistance member 70 and the terminal plate 22d at the upper end of the column unit 22a of the second electrode terminal 22 for caulking the upper end. Therefore, the resistance member 70 and the terminal plate 22d are supported by the cap plate 20. Here, the resistance member 70 electrically connects the cap plate 20 and the column unit 22a.

The resistance member 70, in one embodiment, includes a downward protrusion 71 facing the cap plate 20, and an upward protrusion 73 facing the terminal plate 22d. The downward protrusion 71 is coupled in a groove 72 of the cap plate 20 and the upward protrusion 73 is coupled to a groove 74 of the terminal plate 22d in an assembled state in which the second electrode terminal 22 penetrates the cap plate 20. The downward protrusion 71 and the groove 72 facilitate setting up an installation location of the resistance member 70 on the cap plate 20. The upward protrusion 73 and the groove 74 facilitate setting up an installation location of the terminal plate 22d on the resistance member 70.

Referring to FIG. 2 and FIG. 6, the deformable plate 53 and the second electrode terminal 22 form an electric connection path therebetween through the cap plate 20 and the resistance member 70. In case of external short-circuit, the resistance member 70 increases the external short-circuit resistance value between the first electrode terminal 21 and the second electrode terminal 22 without influencing the output through the first electrode terminal 21 and the second electrode terminal 22, thereby reducing the external short-circuit current.

The resistance member 70, in one embodiment, has a resistance value higher than that of the column unit 22a, the terminal plate 22d, and the cap plate 20. For example, in one embodiment, the terminal plate 22d is formed of aluminum, and the resistance member 70 is formed of at least one of stainless steel, steel, or a nickel steel alloy, such as Invar (Invar is a registered trademark of Imphy Alloys), also referred to as FeNi36 or 64FeNi.

When the rechargeable battery 100 operates normally (i.e. when the deformable plate 53 and the short-circuit tab 51 are separated as shown in FIG. 3), a first electric connection path L1 (see FIG. 6) is formed between the column unit 22a of the second electrode terminal 22 and the terminal plate 22d. In this case, the resistance member 70 does not influence the output of the rechargeable battery 100 despite the high resistance value of the resistance member 70.

By contrast, when the rechargeable battery 100 is externally short-circuited (i.e. when the deformable plate 53 contacts the short-circuit tab 51 as shown in FIG. 4), a second electric connection path L2 (see FIG. 6) is formed through the column unit 22a of the second electrode terminal 22, the terminal plate 22d, the resistance member 70, and the cap plate 20. In this case, the resistance member 70 reduces the external short-circuit current by increasing the external short-circuit resistance value of the externally short-circuited rechargeable battery 100. Therefore, the penetration characteristic of the external short-circuit current may be stabilized. Here, the external short-circuit current penetrates the electrode assembly 10.

A rechargeable battery according to another exemplary embodiment of the present invention is described below. In view of the above description of the rechargeable battery 100, only elements of the another exemplary embodiment differing from those of the rechargeable battery 100 will be described, and description of same elements will not be repeated.

Figure 7:
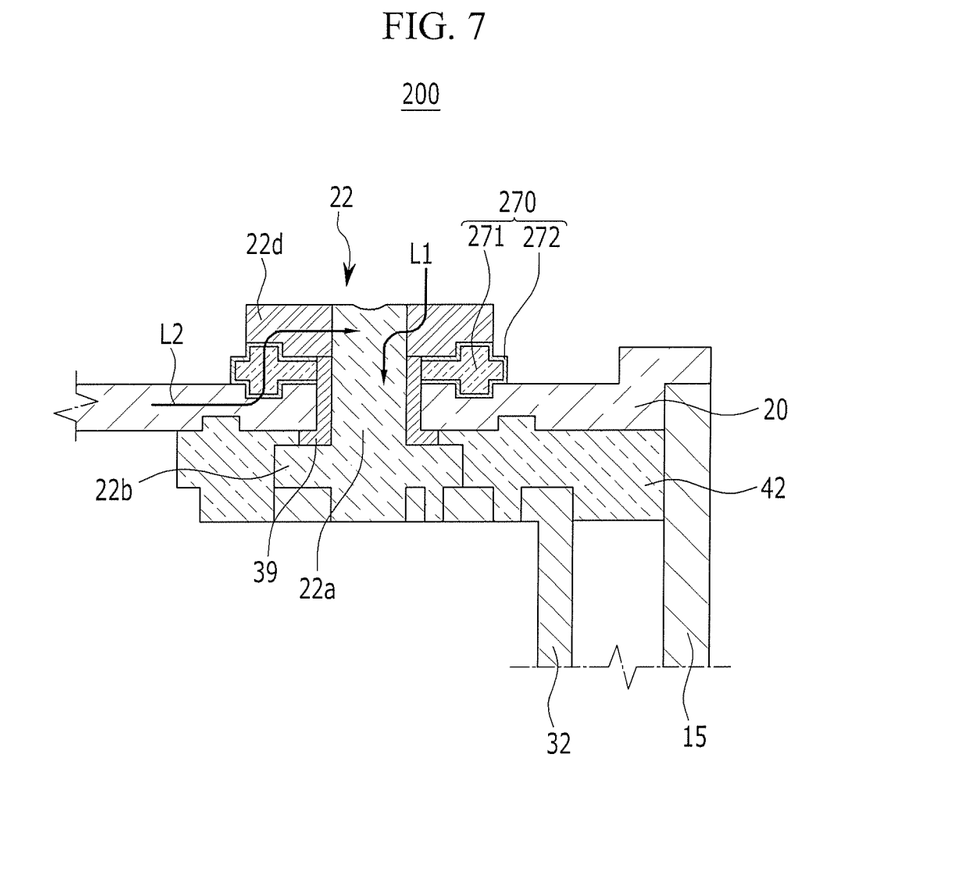
FIG. 7 is a cross-sectional view of an electrode terminal and a cap plate of a rechargeable battery according to another exemplary embodiment of the present invention.

FIG. 7 is a cross-sectional view illustrating a connected state of an electrode terminal (e.g., a positive electrode terminal) and a cap plate of a rechargeable battery according to another exemplary embodiment of the present invention.

A rechargeable battery 200 according to another exemplary embodiment includes a resistance member 270 including a main body 271 and a plating layer 272 formed on a surface of the main body 271. The main body 271, in one embodiment, is made of at least one of stainless steel, steel, or a nickel steel alloy, such as Invar. The plating layer 272, in one embodiment, may be made of nickel (Ni) and/or tin (Sn). In the resistance member 270, the plating layer 272 prevents or substantially prevents the main body 271 from corroding.

When the rechargeable battery 200 operates normally, the first electric connection path L1 is formed between the column unit 22a of the second electrode terminal 22 and the terminal plate 22d. In one embodiment, the main body 271 and the plating layer 272 do not influence the output of the normally operating rechargeable battery 200 although the main body 271 and the plating layer 272 have an electrical resistance value higher than the column unit 22a, the terminal plate 22d, and the cap plate 20.

By contrast, when the rechargeable battery 200 is externally short-circuited, the second electric connection path L2 is formed through the column unit 22a of the second electrode terminal 22, the terminal plate 22d, the main body 271, the plating layer 272, and the cap plate 20. Here, the main body 271 and the plating layer 272 reduce the external short-circuit current by increasing the external short-circuit resistance value of the externally short-circuited rechargeable battery 200. Therefore, the penetration characteristic of the external short-circuit current penetrating the electrode assembly 10 is stabilized.

Figure 8:
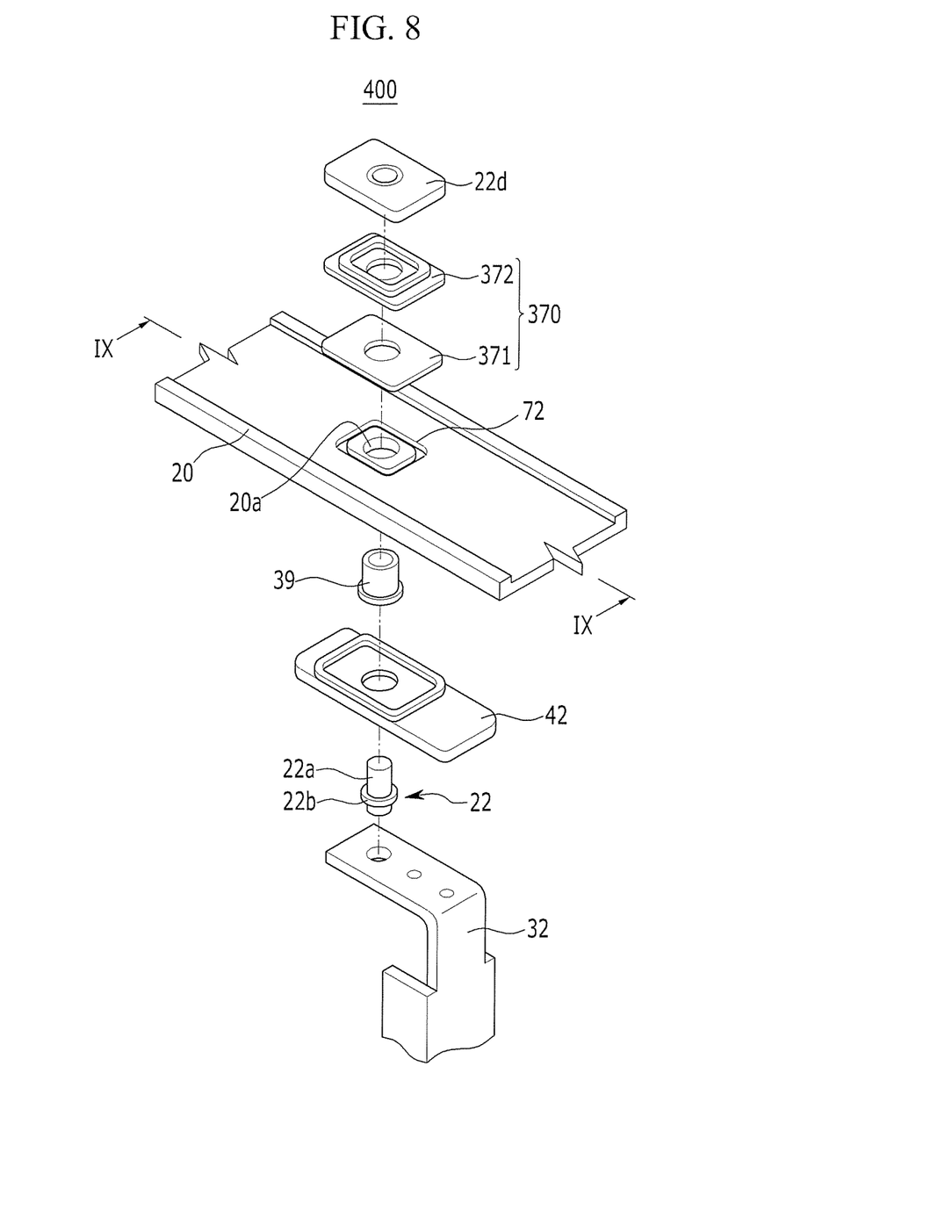
FIG. 8 is an exploded perspective view of an electrode terminal and a cap plate of a rechargeable battery according to another exemplary embodiment of the present invention.
Figure 9:
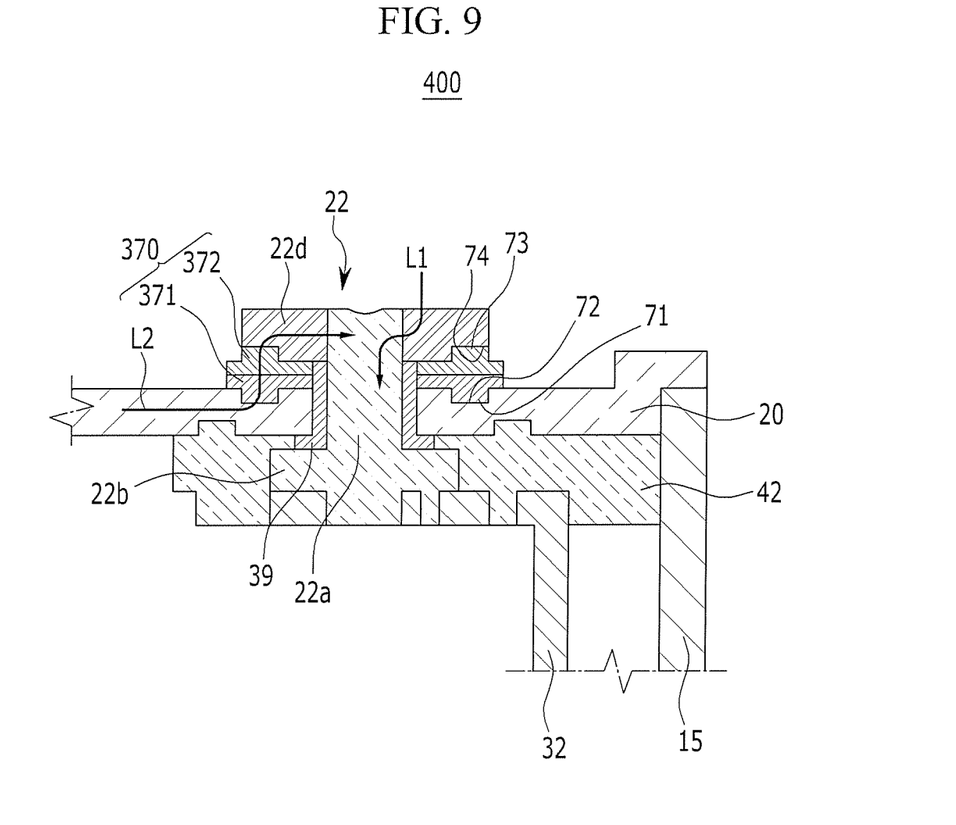
FIG. 9 is a cross-sectional view of the electrode terminal and the cap plate of FIG. 8 taken along the line IX-IX.

FIG. 8 is an exploded perspective view illustrating a disassembled state of an electrode terminal (e.g., a positive electrode terminal) and a cap plate of a rechargeable battery according to another exemplary embodiment of the present invention. FIG. 9 is a cross-sectional view illustrating a connected state of the electrode terminal and the cap plate of FIG. 8 taken along the line IX-IX.

A rechargeable battery 400 according to another exemplary embodiment includes a first resistance unit 371 and a second resistance unit 372 made of different materials.

For example, the first resistance unit 371 may be made of aluminum, and the second resistance unit 372 may be made of at least one of stainless steel, steel, or a nickel steel alloy, such as Invar, having an electrical resistance value higher than that of the first resistance unit 371. In one embodiment, the second resistance unit 372 has an electrical resistance value higher than the electrical resistance values of the column unit 22a, the terminal plate 22d, and the cap plate 20.

In one embodiment, the first resistance unit 371 may be made of at least one of stainless steel, steel, or a nickel steel alloy, such as Invar, and the second resistance unit may be made of aluminum. Further, in one embodiment, at least one of the first and second resistance units 371 and 372 may include a plating layer (e.g., a nickel and/or tin plating layer) on a main body, such as described above with respect to the resistance member 270.

In one embodiment, the first resistance unit 371 is connected to the cap plate 20 through a downward protrusion 71 facing the cap plate 20, and the second resistance unit 372 is coupled to the terminal plate 22d through an upward protrusion 73 facing the terminal plate 22d. In an assembled state in which the second electrode terminal 22 is assembled to the cap plate 20, the downward protrusion 71 and the groove 72 facilitate an installation location of the first resistance unit 371 on the cap plate 20, and the upward protrusion 73 and the groove 74 facilitate an installation location of the terminal plate 22d on the second resistance unit 372.

In one embodiment, the first electric connection path L1 is formed between the column unit 22a of the second electrode terminal 22 and the terminal plate 22d when the rechargeable battery 400 normally operates. The first and second resistance units 371 and 372, in one embodiment, do not influence the output of the normally operating rechargeable battery 400 despite the high electrical resistance value of the first and second resistance units 371 and 372.

By contrast, when the rechargeable battery 400 is externally short-circuited, the second electric connection path L2 is formed through the column unit 22a of the second electrode terminal 22, the terminal plate 22d, the first and second resistance units 371 and 372, and the cap plate 20. Here, the first and second resistance units 371 and 372 reduce the external short-circuit current by increasing the external short-circuit resistance value of the externally short-circuited rechargeable battery 400. Accordingly, the penetration characteristic of the external short-circuit current penetrating the electrode assembly 10 may be stabilized.

While this invention has been described in connection with certain exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   an electrode assembly comprising a first electrode, a second electrode, and a separator between the first electrode and the second electrode;
   a case containing the electrode assembly;
   a cap plate covering an opening of the case;
   an electrode terminal protruding outside the case and electrically connected to the second electrode, the electrode terminal comprising:
     a column unit protruding through an opening of the cap plate; and
     a terminal plate coupled to the column unit outside the case;
   a resistance member between and electrically connecting the electrode terminal and the cap plate at the terminal plate, a resistance of the resistance member being greater than a resistance of the electrode terminal;
   a short-circuit tab electrically coupled to the first electrode; and
   a deformable plate in a short circuit opening in the cap plate and electrically coupled to the second electrode, the deformable plate being configured to deform and contact the short-circuit tab for short circuiting the first electrode and the second electrode to each other through an electric connection path formed through the terminal plate, the resistance member, the cap plate, the deformable plate, and the short-circuit tab when an internal pressure of the rechargeable battery exceeds a reference pressure.

2. The rechargeable battery of claim 1, further comprising an insulating gasket surrounding the column unit and insulating the column unit from each of the cap plate and the resistance member.

3. The rechargeable battery of claim 1, wherein the resistance member comprises:
a first protrusion coupled to the cap plate in a groove of the cap plate; and
a second protrusion coupled to the terminal plate in a groove of the terminal plate.

4. The rechargeable battery of claim 1, wherein a resistance of the resistance member is greater than a resistance of at least one of the column unit, the terminal plate, or the cap plate.

5. The rechargeable battery of claim 1, wherein the resistance member comprises at least one of steel, stainless steel, or a nickel steel alloy.

6. The rechargeable battery of claim 1, wherein the resistance member comprises a body, and a layer on the body.

7. The rechargeable battery of claim 6, wherein the body comprises steel, stainless steel, or a nickel steel alloy, and the layer comprises at least one of nickel or tin.

8. The rechargeable battery of claim 6, wherein a resistance of the body and the layer is greater than a resistance of at least one of the electrode terminal or the cap plate.

9. The rechargeable battery of claim 1, wherein the resistance member comprises:
a first resistance unit contacting the cap plate; and
a second resistance unit contacting the electrode terminal.

10. The rechargeable battery of claim 9, wherein the first resistance unit comprises a first material, and the second resistance unit comprises a second material having a resistance different than a resistance of the first material.

11. The rechargeable battery of claim 9, wherein one of the first and second resistance units comprises steel, stainless steel, or a nickel steel alloy, and the other of the first and second resistance units comprises aluminum.

12. The rechargeable battery of claim 9,
wherein the first resistance unit comprises a first protrusion coupled to the cap plate in a groove of the cap plate, and
wherein the second resistance unit comprises a second protrusion coupled to the electrode terminal in a groove of the electrode terminal.

13. The rechargeable battery of claim 9, wherein a resistance of at least one of the first resistance unit or the second resistance unit is greater than a resistance of at least one of the electrode terminal or the cap plate.

14. The rechargeable battery of claim 1, further comprising an insulating member between the cap plate and the short-circuit tab and having an opening over the deformable plate, the deformable plate protruding through the opening to contact the short-circuit tab when the internal pressure of the rechargeable battery exceeds the reference pressure.

15. The rechargeable battery of claim 1, wherein a peripheral portion of the deformable plate is attached to the cap plate, and an inner portion of the deformable plate inside the peripheral portion is arranged within the short circuit opening in the cap plate.

16. The rechargeable battery of claim 1, further comprising another electrode terminal protruding outside the case and electrically connected to the first electrode, wherein the first electrode and the second electrode are short circuited through the resistance member, the cap plate, and the another electrode terminal when the deformable plate contacts the short-circuit tab.

17. The rechargeable battery of claim 1, wherein the electric connection path formed through the terminal plate, the resistance member, the cap plate, the deformable plate, and the short-circuit tab when the deformable plate contacts the short-circuit tab has a resistance greater than a resistance of a first electric connection path through the electrode terminal.

* * * * *